United States Patent
Mukaigawa et al.

(10) Patent No.: US 10,926,805 B2
(45) Date of Patent: Feb. 23, 2021

(54) ROCKER STRUCTURE

(71) Applicant: TOYOTA JIDOSHA KABUSHIKI KAISHA, Toyota (JP)

(72) Inventors: Yuuki Mukaigawa, Seto (JP); Tomohito Sono, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

(21) Appl. No.: 16/266,225

(22) Filed: Feb. 4, 2019

(65) Prior Publication Data

US 2019/0248419 A1    Aug. 15, 2019

(30) Foreign Application Priority Data

Feb. 13, 2018   (JP) .................................. 2018-022974

(51) Int. Cl.
*B62D 25/02* (2006.01)
*B62D 25/20* (2006.01)
*B62D 29/00* (2006.01)

(52) U.S. Cl.
CPC .......... *B62D 25/025* (2013.01); *B62D 25/20* (2013.01); *B62D 29/008* (2013.01)

(58) Field of Classification Search
CPC ..... B62D 25/025; B62D 25/20; B62D 29/008
See application file for complete search history.

(56) References Cited

U.S. PATENT DOCUMENTS

| 5,613,727 A * | 3/1997 | Yamazaki ............... B62D 25/02 296/187.12 |
| 2013/0088044 A1 | 4/2013 | Charbonneau et al. |

FOREIGN PATENT DOCUMENTS

JP   2008-100548   5/2008

OTHER PUBLICATIONS

U.S. Appl. No. 16/265,415, filed Feb. 1, 2019, Tomohito Sono, et al.

* cited by examiner

Primary Examiner — D Glenn Dayoan
Assistant Examiner — Melissa Ann Bonifazi
(74) Attorney, Agent, or Firm — Oblon, McClelland, Maier & Neustadt, L.L.P.

(57) ABSTRACT

A rocker structure includes: a closed cross-sectional part that extends along a vehicle front-rear direction on an outer side of a floor panel of a vehicle in a vehicle width direction, the closed cross-sectional part including an outer wall and an inner wall located respectively on an outer side and an inner side of the closed cross-sectional part in the vehicle width direction; and a horizontal plate propped between the outer wall and the inner wall along the vehicle width direction, the horizontal plate having ridges protruding upward in a vehicle height direction and valleys depressed downward in the vehicle height direction that are provided alternately along the vehicle width direction, an amount of protrusion of the ridges and an amount of depression of the valleys varying from an outer wall side toward an inner wall side.

8 Claims, 7 Drawing Sheets

ROCKER STRUCTURE

INCORPORATION BY REFERENCE

The disclosure of Japanese Patent Application No. 2018-022974 filed on Feb. 13, 2018 including the specification, drawings and abstract is incorporated herein by reference in its entirety.

BACKGROUND

1. Technical Field

The present disclosure relates to a rocker structure.

2. Description of Related Art

U.S. Ser. No. 13/008,8044 A discloses a technique related to a rocker that shows a closed cross-sectional part when cut along a vehicle width direction. This technique features a plate member having an X-shaped cross-section that is provided inside the closed cross-sectional part. According to this related art, in the event of a lateral collision of a vehicle, the collision energy can be absorbed as the plate member becomes folded (undergoes buckling deformation).

SUMMARY

As described above, in the related art, collision energy can be absorbed as the X-shaped plate member undergoes buckling deformation by becoming folded. However, allowing the plate member to undergo buckling deformation easily so as to stabilize the buckling deformation of the plate member may result in a reduced absorption amount of collision energy. It is then conceivable to increase the plate thickness of the plate member, but this will cause an increase in weight of the rocker.

The present disclosure provides a rocker structure that can increase the absorption amount of collision energy while avoiding an increase in weight.

An aspect of the disclosure provides a rocker structure, including: a closed cross-sectional part that extends along a vehicle front-rear direction on an outer side of a floor panel of a vehicle in a vehicle width direction, the closed cross-sectional part including an outer wall and an inner wall located respectively on an outer side and an inner side of the closed cross-sectional part in the vehicle width direction; and a horizontal plate propped between the outer wall and the inner wall along the vehicle width direction, the horizontal plate having ridges protruding upward in a vehicle height direction and valleys depressed downward in the vehicle height direction that are provided alternately along the vehicle width direction, an amount of protrusion of the ridges and an amount of depression of the valleys varying from an outer wall side toward an inner wall side.

In the rocker structure according to this aspect, the rocker is provided with the closed cross-sectional part that extends along the vehicle front-rear direction on the outer side of the floor panel of the vehicle in the vehicle width direction. Inside the closed cross-sectional part, the horizontal plate is propped along the vehicle width direction between the outer wall and the inner wall located respectively on the outer side and the inner side of the rocker in the vehicle width direction.

The horizontal plate has the ridges protruding upward in the vehicle height direction and the valleys depressed downward in the vehicle height direction that are formed alternately along the vehicle width direction. In this horizontal plate, the amount of protrusion of the ridges and the amount of depression of the valleys are varied from the outer wall side toward the inner wall side of the rocker.

As described above, in this aspect, the horizontal plate propped between the outer wall and the inner wall of the rocker is provided inside the closed cross-sectional part of the rocker. Thus, compared with when this horizontal plate is not provided, the rigidity of the rocker can be enhanced and deformation of the rocker can be suppressed.

In a lateral collision of the vehicle, the collision energy is absorbed as the rocker undergoes plastic deformation (buckling deformation). In this aspect, the horizontal plate has the ridges protruding upward in the vehicle height direction and the valleys depressed downward in the vehicle height direction that are formed alternately along the vehicle width direction.

In a lateral collision of the vehicle, therefore, the horizontal plate undergoes buckling deformation with those ridges and valleys forming starting points of the deformation. As a result, the horizontal plate becomes folded along the vehicle width direction and thus the deformation mode is controlled. This means that the buckling deformation of the horizontal plate is stabilized and the collision energy absorption efficiency can be increased.

Here, for example, when the amount of protrusion of the ridges and the amount of depression of the valleys are large, the horizontal plate undergoes buckling deformation easily and the buckling deformation is stabilized, but the absorption amount of collision energy is reduced. Conversely, when the amount of protrusion of the ridges and the amount of depression of the valleys are small, the horizontal plate is enhanced in rigidity and the buckling deformation becomes unstable, but the absorption amount of collision energy is increased.

In this aspect, therefore, the amount of protrusion of the ridges and the amount of depression of the valleys in the horizontal plate are set so as to vary from the outer wall side toward the inner wall side of the rocker. Thus, it is possible to stabilize the buckling deformation as well as to increase the absorption amount of collision energy.

In this aspect, it is possible to increase the absorption amount of collision energy without increasing the plate thickness of the horizontal plate, by providing the horizontal plate with the ridges and the valleys and varying the amount of protrusion of the ridges and the amount of depression of the valleys. In other words, in this aspect, the horizontal plate is allowed to absorb an increased amount of collision energy without the weight thereof being increased.

The description "formed alternately along the vehicle width direction" in this aspect means not only a shape in which the ridges and the valleys are formed continuously and alternately along the vehicle width direction, but also a shape in which the ridges and the valleys are formed discontinuously and alternately. An amount of protrusion of a ridge may be a distance in the vehicle height direction between the center of the horizontal plate in the vehicle height direction to a vertex of the ridge, and an amount of depression of a valley may be a distance in the vehicle height direction from the center of the horizontal plate in the vehicle height direction to a vertex of the valley.

In the above aspect, the amount of protrusion of the ridges and the amount of depression of the valleys may decrease from the outer wall side toward the inner wall side.

In the rocker structure according to this configuration, the amount of protrusion of the ridges and the amount of depression of the valleys are set so as to decrease from the outer wall side toward the inner wall side. Accordingly, the amount of protrusion of the ridges and the amount of depression of the valleys are larger on the outer wall side of the rocker, and the amount of protrusion of the ridges and the amount of depression of the valleys are smaller on the inner wall side of the rocker. In a lateral collision of the vehicle, therefore, buckling deformation is stabilized on the outer wall side of the rocker, while the rigidity can be enhanced, and the absorption amount of collision energy can be increased, toward the inner wall side of the rocker.

Thus, according to this configuration, in a lateral collision of the vehicle, buckling deformation is stabilized on the outer wall side of the rocker, while the absorption amount of collision energy can be increased toward the inner wall of the rocker.

In the above aspect, the rocker structure may further include a vertical plate that is provided inside the closed cross-sectional part so as to extend along the vehicle height direction between the horizontal plate and a lower wall located on a lower side of the closed cross-sectional part in the vehicle height direction.

In the rocker structure according to this configuration, the vertical plate is provided inside the closed cross-sectional part so as to be propped along the vehicle height direction between the horizontal plate and the lower wall located on the lower side of the closed cross-sectional part in the vehicle height direction. Thus, the horizontal plate is reinforced and wobbling thereof in the vehicle height direction is suppressed. In other words, this configuration can enhance the rigidity of the rocker and suppress deformation of the rocker compared with when the vertical plate is not provided.

Thus, this configuration can increase the collision energy absorption efficiency by stabilizing the buckling deformation of the rocker, as well as can increase the absorption amount of collision energy as the rocker undergoes buckling deformation by increasing the load-carrying capacity of the rocker.

In the above aspect, the vertical plate may be provided between a vertex of a ridge among the ridges and a vertex of a valley adjacent to the ridge among the valleys in the horizontal plate.

When the horizontal plate undergoes buckling deformation, the horizontal plate deforms with the vertices of the ridges and the vertices of the valleys forming starting points of the deformation. For this reason, in the rocker structure according to the above configuration, the vertical plate is provided between the vertex of the ridge and the vertex of the valley in the horizontal plate. That is, the vertical plate is not provided at the vertex of the ridge or the vertex of the valley, so as not to interfere with deformation of the horizontal plate.

In the above aspect, the horizontal plate may have a first ridge of the ridges on a side closer to the outer wall than a first valley located closest to the outer wall among the valleys; and the vertical plate may be provided at a position at which the vertical plate intersects with an inflection point between the first ridge and the first valley.

In this configuration, the ridge is formed on the outer wall side of the horizontal plate. Thus, when the horizontal plate undergoes buckling deformation in a lateral collision of the vehicle, the horizontal plate deforms upward with this ridge forming a starting point of the deformation on the outer wall side of the horizontal plate.

In this configuration, the vertical plate is provided at a position at which the vertical plate intersects with the inflection point between the ridge and the valley on the outer wall side of the horizontal plate, so that the vertical plate is subjected to a load in a tensile direction when an outer wall-side part of the horizontal plate undergoes buckling deformation. Thus, it is possible to suppress buckling deformation of the vertical plate, as well as to increase the load-carrying capacity of the rocker and increase the absorption amount of collision energy as the rocker undergoes buckling deformation.

In the above aspect, the horizontal plate may be disposed in a middle of the closed cross-sectional part in the vehicle height direction.

For example, when the horizontal plate is provided on the lower side of the closed cross-sectional part in the vehicle height direction, the horizontal plate will be left partially uncrushed if the horizontal plate hits the lower wall of the closed cross-sectional part (reaches a limit) while undergoing buckling deformation. In this case, collision energy cannot be efficiently absorbed, and the amount of collision energy absorbed by the rocker may be reduced.

For this reason, in the above configuration, the horizontal plate is disposed in the middle of the closed cross-sectional part in the vehicle height direction. Thus, the likelihood of the horizontal plate hitting the upper wall or the lower wall of the closed cross-sectional part while the horizontal plate undergoing buckling deformation can be reduced. As a result, the likelihood of the horizontal plate being left partially uncrushed can be reduced.

In the above aspect, the horizontal plate may have a corrugated shape in which the ridges and the valleys are alternately formed; and a first ridge of the ridges may be provided on a side of the horizontal plate closer to the outer wall than a first valley closest to the outer wall among the valleys, and a level difference between a vertex of the first ridge and a point of intersection between the horizontal plate and the outer wall may be set to be smaller than an amplitude of the first ridge.

For example, when the level difference between the vertex of the ridge and the point of intersection between the horizontal plate and the outer wall is large, the horizontal plate undergoes buckling deformation easily. Thus, in this case, the absorption amount of collision energy is reduced.

In the above configuration, therefore, the first ridge of the ridges is provided on the side of the horizontal plate closer to the outer wall than the first valley closest to the outer wall among the valleys, and the level difference between the vertex of the first ridge and the point of intersection between the horizontal plate and the outer wall is set to be smaller than the amplitude of the first ridge. Thus, the horizontal plate does not easily undergo buckling deformation, and an initial load associated with buckling deformation of the horizontal plate can be increased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A rocker structure according to an embodiment of the present disclosure will be described based on the drawings. The arrows FR, UP, and OUT shown as necessary in the drawings respectively indicate a direction toward a vehicle front side, a direction toward a vehicle upper side, and a direction toward an outer side in a vehicle width direction, in a rocker to which the rocker structure according to an embodiment of the present disclosure is applied. Unless otherwise noted, directions referred to simply as front and rear sides, upper and lower sides, and left and right sides in the following description respectively mean front and rear sides in a vehicle front-rear direction, upper and lower sides in a vehicle height direction, and left and right sides as seen in a direction toward the front side.

Configuration of Rocker Structure

Figure 1:
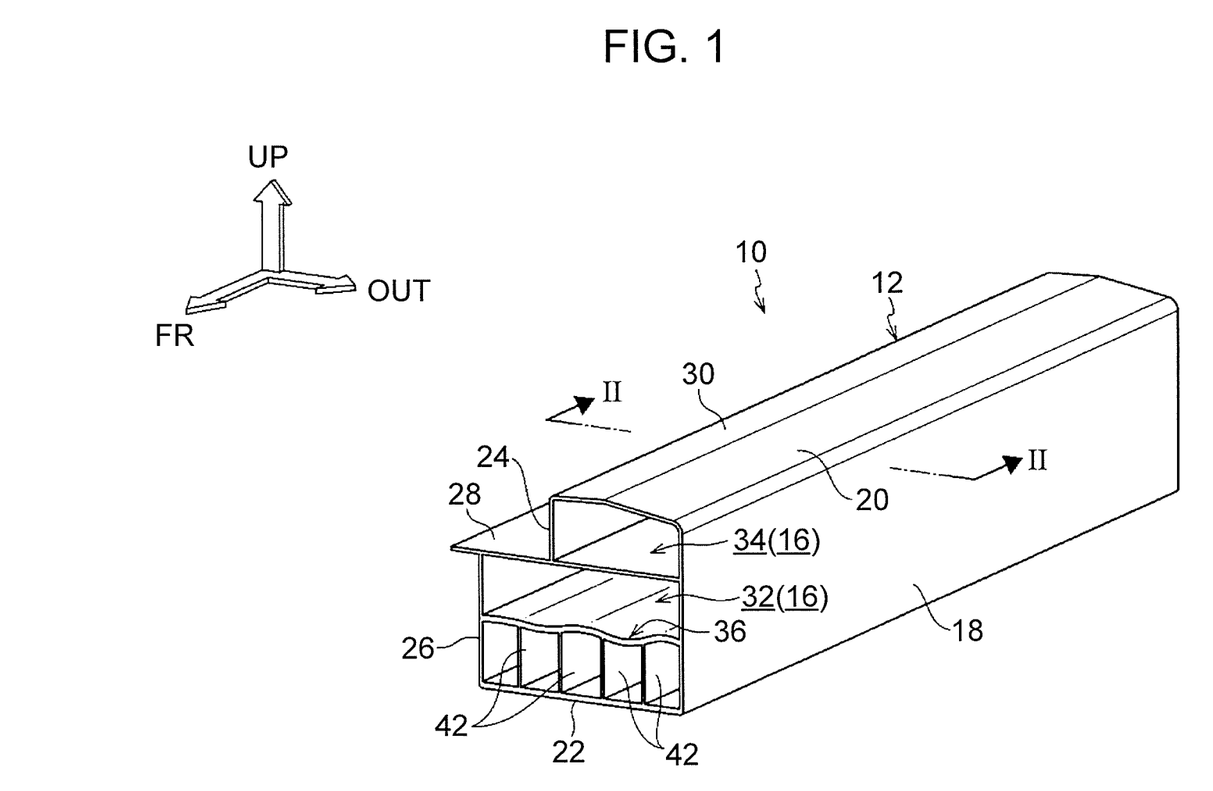
FIG. 1 is a perspective view of a rocker to which a rocker structure according to an embodiment is applied.

First, the configuration of the rocker structure according to the embodiment will be described. FIG. 1 is a perspective view of a rocker 10 to which the rocker structure according to the embodiment is applied.

A floor panel (this case is not shown) extends at a lower part of a vehicle along the vehicle width direction and the vehicle front-rear direction. On the lower side of the floor panel, for example, a battery pack (rechargeable battery) formed by lithium-ion batteries, nickel-metal hydride batteries, or the like is installed as a driving force supply device that supplies electricity to a power unit, such as a motor. In place of the battery pack, a hydrogen tank (fuel cell) may be installed.

Figure 2:
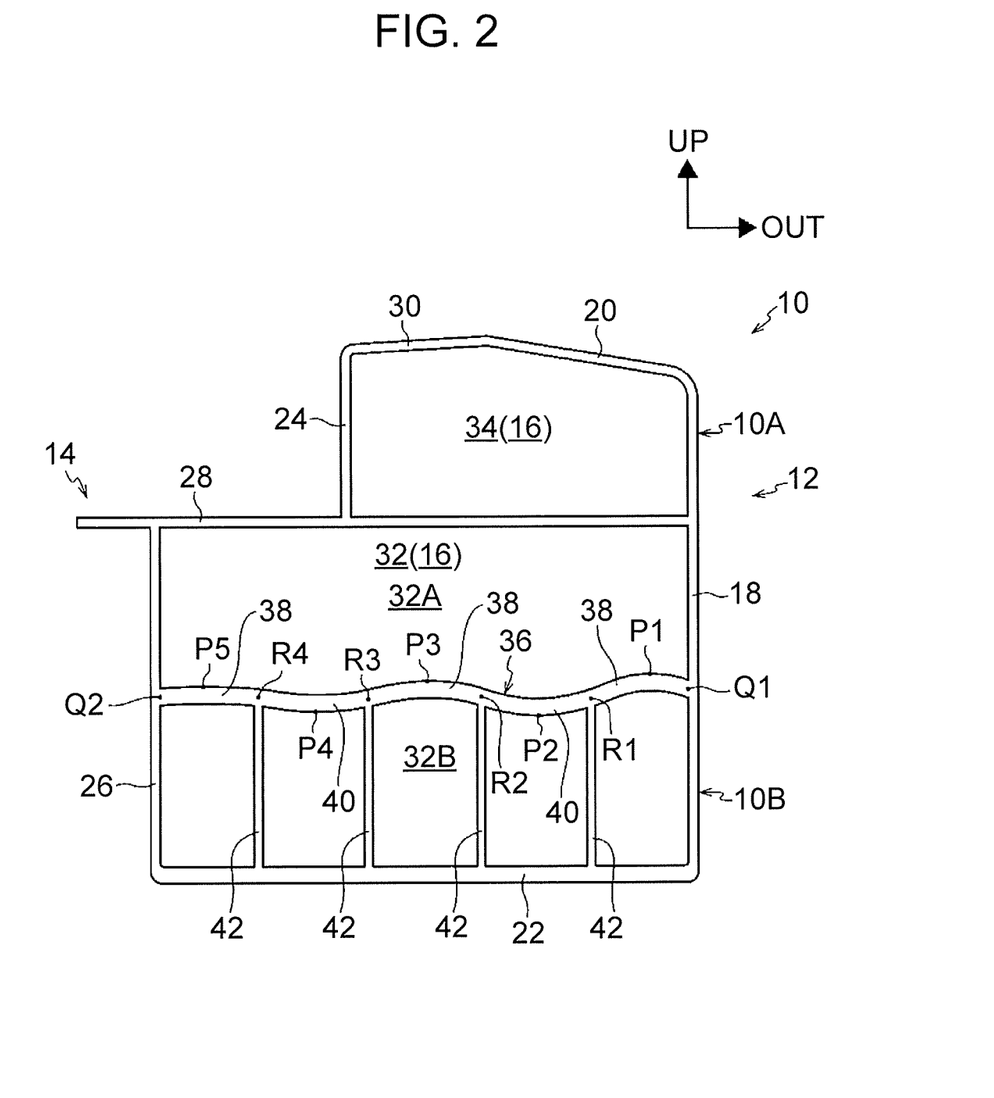
FIG. 2 is a sectional view of the rocker cut along line 2-2 in FIG. 1.

The rocker 10 extends along the vehicle front-rear direction at each end of the floor panel in the vehicle width direction. As shown in FIG. 2, the rocker 10 includes an outer part 12 located on the outer side in the vehicle width direction and an inner part 14 located on the inner side in the vehicle width direction.

For example, the rocker 10 is made of metal, such as aluminum alloy. The outer part 12 and the inner part 14 are integrally formed by extrusion, drawing, etc., and a closed cross-sectional part 16 is formed by the outer part 12 and the inner part 14. However, it is not essential to integrally form the outer part 12 and the inner part 14. For example, the outer part 12 and the inner part 14 may be joined together by welding or fastening so as to be integrated.

In a cross-sectional shape of the outer part 12 cut along the vehicle width direction, the outer part 12 includes an outer wall 18 that is formed along the height direction, an inclined upper wall 20 that is connected to an upper end of the outer wall 18 and inclined upward while extending toward the inner side in the vehicle width direction, and a portion of a lower wall 22 that is connected to a lower end of the outer wall 18 and located on the lower side of the closed cross-sectional part 16.

In a cross-sectional shape of the inner part 14 cut along the vehicle width direction, the inner part 14 includes an upper inner wall 24 that is formed along the height direction on the upper side of the inner part 14, and a lower inner wall (inner wall) 26 that is formed along the vehicle height direction on the lower side of the inner part 14.

The lower inner wall 26 is located farther on the inner side in the vehicle width direction than the upper inner wall 24, and a horizontal wall 28 formed along a substantially horizontal direction is provided between an upper end of the lower inner wall 26 and a lower end of the upper inner wall 24. The horizontal wall 28 extends from the upper inner wall 24 toward the side of the closed cross-sectional part 16 and is connected to the outer wall 18 of the outer part 12, and the rocker 10 is thereby divided into an upper part 10A and a lower part 10B.

An inclined upper wall 30 that is gently inclined upward while extending toward the outer side in the vehicle width direction is connected to an upper end of the upper inner wall 24, and the inclined upper wall 30 is formed so as to be connected to the inclined upper wall 20 of the outer part 12. Another portion of the lower wall 22 located on the lower side of the closed cross-sectional part 16 is connected to a lower end of the lower inner wall 26.

The upper inner wall 24 of the inner part 14 is located farther on the outer side in the vehicle width direction than the lower inner wall 26 as described above, so that the area of the closed cross-sectional part differs between the upper part 10A and the lower part 10B of the rocker 10. Specifically, the area of a lower closed cross-sectional part 32 provided on the side of the lower part 10B of the rocker 10 is larger than the area of an upper closed cross-sectional part 34 provided on the side of the upper part 10A of the rocker 10, and thus the rigidity of the rocker 10 is higher on the side of the lower part 10B than on the side of the upper part 10A.

In this embodiment, a horizontal plate 36 is provided substantially in the middle of the lower closed cross-sectional part 32 in the vehicle height direction, so as to be propped along the vehicle width direction between the outer wall 18 of the outer part 12 and the lower inner wall 26 of the inner part 14. Thus, the lower closed cross-sectional part 32 is further divided by the horizontal plate 36 into a closed cross-sectional part 32A and a closed cross-sectional part 32B.

Figure 3:
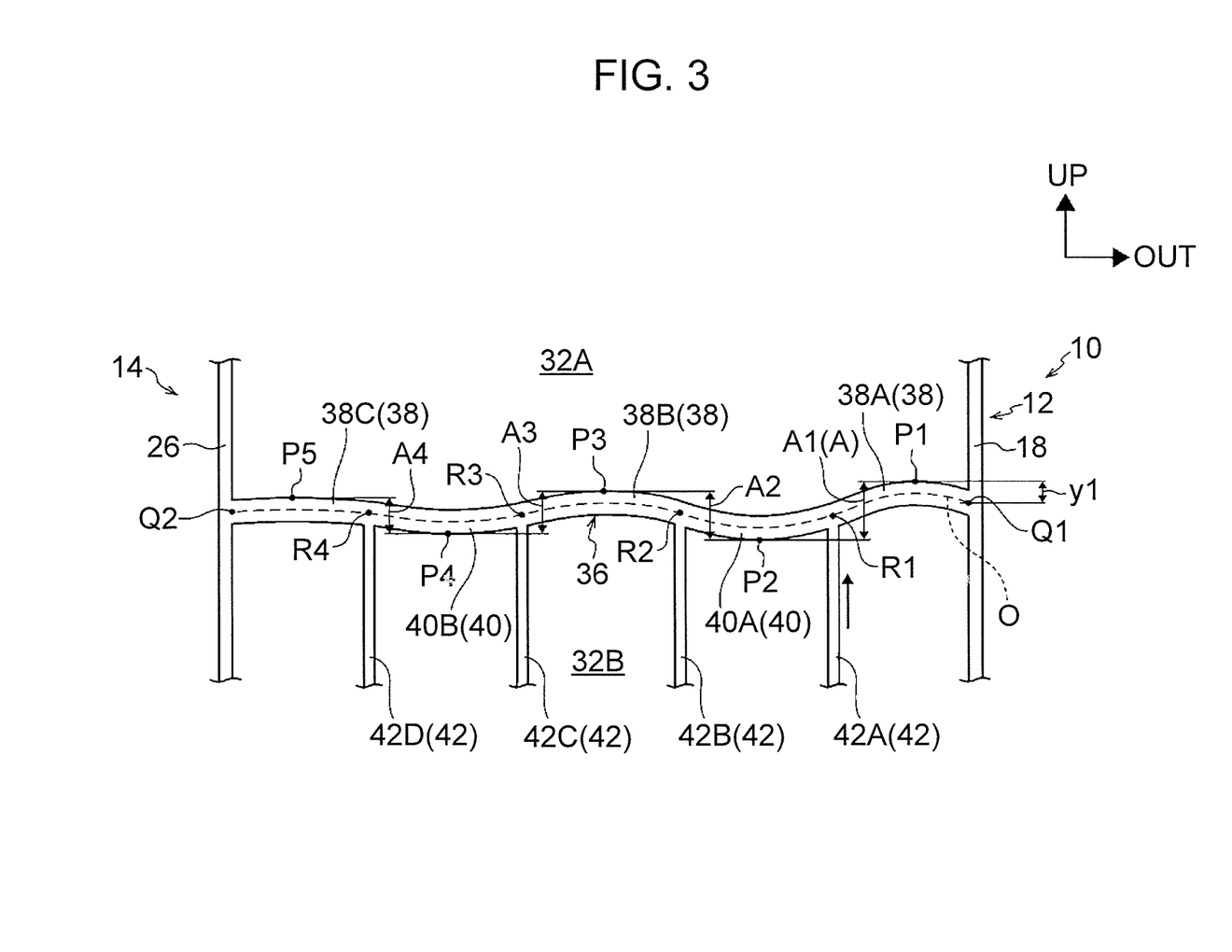
FIG. 3 is an enlarged partial sectional view showing a close-up of a part of FIG. 2.

Here, as shown in FIG. 3, the horizontal plate 36 has a corrugated shape. The horizontal plate 36 has ridges 38 protruding upward and valleys 40 depressed downward that are formed alternately and continuously along the vehicle width direction while the plate thickness of the horizontal plate 36 remains substantially constant.

To go into more detail, in this embodiment, the horizontal plate 36 has a ridge 38A, a valley 40A, a ridge 38B, a valley 40B, and a ridge 38C formed continuously in this order from the side of the outer wall 18, and the vertices of the ridge 38A, the valley 40A, the ridge 38B, the valley 40B, and the ridge 38C are referred to as vertices P1, P2, P3, P4, and P5, respectively.

The ridges 38 and the valleys 40 form a corrugation that is waved at a substantially constant frequency, with the amplitude set so as to decrease gradually in the order of A1, A2, A3, and A4 (A1>A2>A3>A4) from the side of the outer wall 18 toward the side of the lower inner wall 26. As shown in FIG. 3, in this specification, the term amplitude can be regarded as a difference in position in the vehicle height direction between the vertex of a ridge and the vertex of a valley located adjacent to and on the inner side of this ridge in the vehicle width direction.

In this embodiment, a point of intersection Q1 between the horizontal plate 36 and the outer wall 18 is a starting position of the corrugation of the horizontal plate 36, and a point of intersection Q2 between the horizontal plate 36 and the lower inner wall 26 is an ending position of the corrugation of the horizontal plate 36. A level difference y1 between the vertex P1 of the ridge 38A and the corrugation starting position Q1 in the horizontal plate 36 is set to be smaller than the amplitude A1 of the corrugation of the horizontal plate 36.

As shown in FIG. 2 and FIG. 3, a plurality of lower vertical plates (vertical plates) 42 is propped between the horizontal plate 36 and the lower wall 22 on the side of the closed cross-sectional part 32B, and the lower vertical plates 42 are referred to as a lower vertical plate 42A, a lower vertical plate 42B, a lower vertical plate 42C, and a lower vertical plate 42D, respectively, in this order from the side of the outer wall 18.

The lower vertical plate 42A is provided between the vertex P1 of the ridge 38A and the vertex P2 of the valley 40A in the horizontal plate 36, at a position at which the lower vertical plate 42A intersects with an inflection point R1 between the ridge 38A and the valley 40A. The lower vertical plate 42B is provided between the vertex P2 of the valley 40A and the vertex P3 of the ridge 38B in the horizontal plate 36, at a position at which the lower vertical plate 42B intersects with an inflection point R2 between the valley 40A and the ridge 38B.

The lower vertical plate 42C is provided between the vertex P3 of the ridge 38B and the vertex P4 of the valley 40B in the horizontal plate 36, at a position at which the lower vertical plate 42C intersects with an inflection point R3 between the ridge 38B and the valley 40B. The lower vertical plate 42D is provided between the vertex P4 of the valley 40B and the vertex P5 of the ridge 38C in the horizontal plate 36, at a position at which the lower vertical plate 42D intersects with an inflection point R4 between the valley 40B and the ridge 38C. The inflection points R1, R2, R3, R4 are provided on a neutral axis O of the horizontal plate 36.

Workings and Effects of Rocker Structure

Next, the workings and effects of the rocker structure according to the embodiment will be described.

In this embodiment, as shown in FIG. 2 and FIG. 3, the horizontal plate 36 is provided inside the lower closed cross-sectional part 32 of the rocker 10 so as to be propped along the vehicle width direction between the outer wall 18 of the outer part 12 and the lower inner wall 26 of the inner part 14. The horizontal plate 36 has the ridges 38 and the valleys 40 that are formed continuously and alternately along the vehicle width direction.

When the horizontal plate 36 propped between the outer wall 18 and the lower inner wall 26 of the rocker 10 is thus provided inside the lower closed cross-sectional part 32 of the rocker 10, the rigidity of the rocker 10 can be enhanced and deformation of the rocker 10 can be suppressed compared with when the horizontal plate 36 is not provided (this case is not shown). Accordingly, in this embodiment, the load-carrying capacity of the rocker 10 can be increased.

For example, the battery pack (not shown) is installed on the inner side of the pair of rockers 10. In a lateral collision of the vehicle, when a load of the lateral collision is input into the rocker 10, the collision energy is absorbed as the rocker 10 undergoes plastic deformation (buckling deformation) by receiving a reaction force from the battery pack.

In this case, inside the lower closed cross-sectional part 32 of the rocker 10, the horizontal plate 36 undergoes buckling deformation with the ridges 38 and the valleys 40 forming starting points of the deformation. Specifically, the horizontal plate 36 becomes folded along the vehicle width direction, in the order of the vertex P1 of the ridge 38A, the vertex P2 of the valley 40A, the vertex P3 of the ridge 38B, the vertex P4 of the valley 40B, and the vertex P5 of the ridge 38C, and thus the deformation mode is controlled. This means that the buckling deformation of the horizontal plate 36 is stabilized and the collision energy absorption efficiency can be increased.

Here, for example, when the amplitude of the ridges 38 and the amplitude of the valleys 40 are large, the horizontal plate 36 undergoes buckling deformation easily and the buckling deformation is stabilized, but the absorption amount of collision energy is reduced. Conversely, when the amplitude of the ridges 38 and the amplitude of the valleys 40 are small, the horizontal plate 36 is enhanced in rigidity and does not easily undergo buckling deformation and thus the buckling deformation becomes unstable, but the absorption amount of collision energy is increased.

Figure 4:
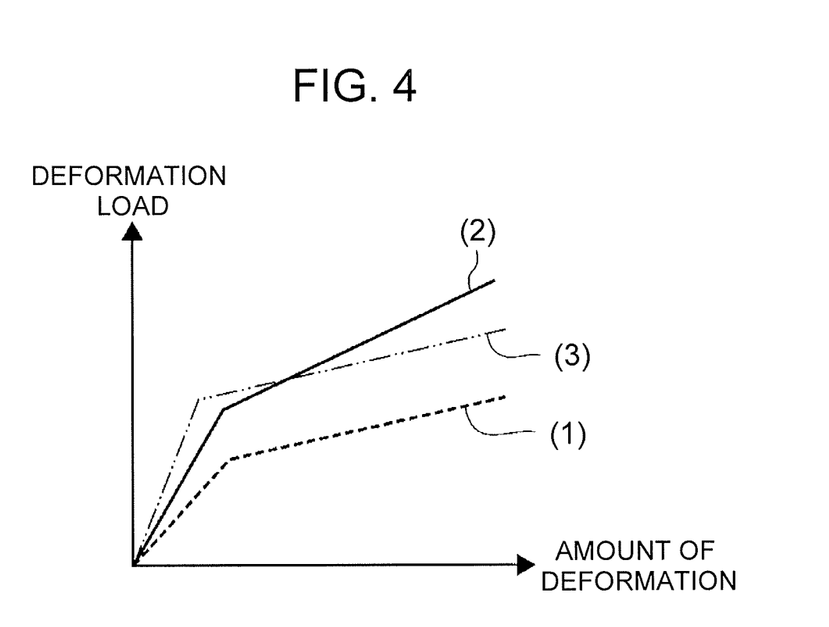
FIG. 4 is a graph showing a relationship between an amount of deformation of a horizontal plate and a deformation load in a lateral collision of a vehicle.

For example, FIG. 4 is a graph showing a relationship between an amount of deformation of the horizontal plate and a deformation load in a lateral collision of the vehicle, with the lines (1) to (3) representing horizontal plates of different shapes.

To go into more detail, the line (1) shown in FIG. 4 represents a case where an amplitude (A) of the ridges and the valleys in the horizontal plate remains the same from the outer wall 18 toward the lower inner wall 26 of the rocker 10 shown in FIG. 3 (this case is not shown).

Figure 5A:
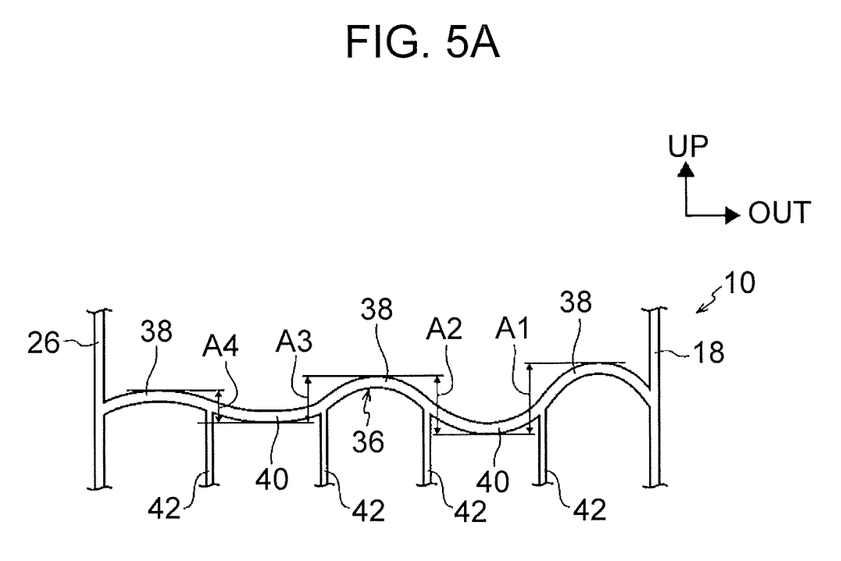
FIG. 5A is an enlarged sectional view of a main part of the rocker structure according to the embodiment.

The line (2) shown in FIG. 4 represents a case where, as shown in FIG. 5A, the amplitude of the ridges 38 and the valleys 40 in the horizontal plate 36 is set so as to decrease gradually in the order of A1, A2, A3, and A4 from the side of the outer wall 18 toward the side of the lower inner wall 26 of the rocker 10.

Figure 5B:
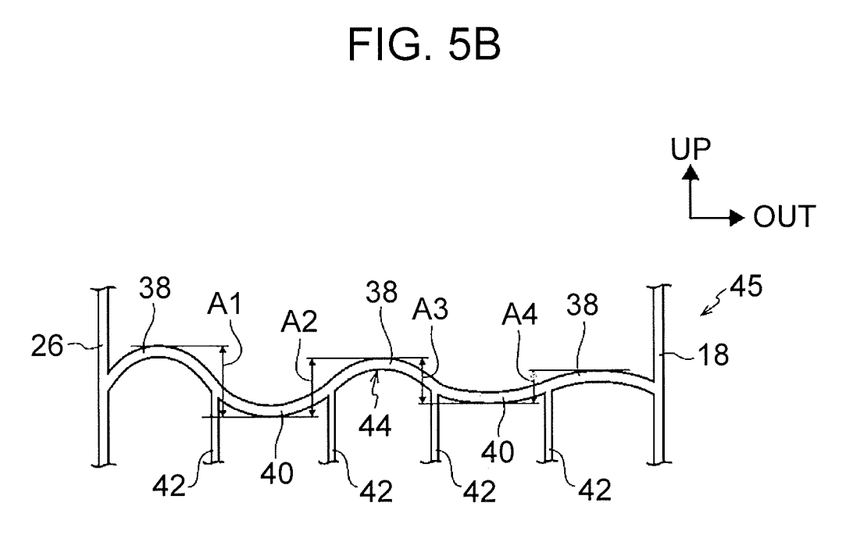
FIG. 5B is an enlarged sectional view of the main part showing a modified example of the rocker structure shown in FIG. 5A.

The line (3) shown in FIG. 4 represents a case where, as shown in FIG. 5B, the amplitude of the ridges 38 and the valleys 40 in a horizontal plate 44 is set so as to increase gradually in the order of A4, A3, A2, and A1 from the side of the outer wall 18 toward the side of the lower inner wall 26 of a rocker 45. The maximum amplitude (A1) in the cases of the lines (2) and (3) shown in FIG. 4 is substantially equal to the amplitude (A) in the case of the line (1) shown in FIG. 4.

As can be seen from this graph, the deformation load is larger and the absorption amount of collision energy is larger when the amplitude of the ridges and the valleys in the horizontal plate is varied from the side of the outer wall 18 toward the side of the lower inner wall 26 of the rocker 10, than when the amplitude remains the same from the outer wall 18 toward the lower inner wall 26 of the rocker 10.

When the maximum amplitude (A1) in the cases of the lines (2) and (3) shown in FIG. 4 is substantially equal to the amplitude (A) in the case of the line (1) shown in FIG. 4, the overall lengths of the horizontal plates 36, 44 (see FIGS. 5A and 5B) in the cases of the lines (2) and (3) shown in FIG. 4 can be made shorter than the overall length of the horizontal plate in the case of the line (1) shown in FIG. 4.

It can be seen that varying the amplitude of the ridges 38 and the valleys 40 from the side of the outer wall 18 toward the side of the lower inner wall 26 of the rocker 10 as in the horizontal plates 36, 44 shown in FIGS. 5A and 5B therefore can increase the amount of collision energy absorbed by the horizontal plates 36, 44 while avoiding an increase in the weight thereof.

When the amplitude of the ridges 38 and the valleys 40 is set so as to decrease gradually from the side of the outer wall 18 toward the side of the lower inner wall 26 of the rocker 10 as in the case of the line (2) of FIG. 4 and as shown in FIG. 5A, an initial load associated with buckling deformation of the horizontal plate 36 is slightly smaller but the absorption amount of collision energy is larger than when the amplitude of the ridges 38 and the valleys 40 is set so as to increase gradually as in the case of the line (3) of FIG. 4 and as shown in FIG. 5B.

In this embodiment, therefore, as shown in FIG. 5A, the amplitude of the ridges 38 and the valleys 40 in the horizontal plate 36 is set so as to decrease gradually in the order of A1, A2, A3, and A4 from the side of the outer wall 18 toward the side of the lower inner wall 26 of the rocker 10. Thus, it is possible to stabilize buckling deformation as well as to increase the absorption amount of collision energy.

Accordingly, the amplitude A1 of the ridge 38 on the side of the outer wall 18 of the rocker 10 is larger, and the amplitude A4 of the ridge 38 on the side of the lower inner wall 26 of the rocker 10 is smaller. In a lateral collision of the vehicle, therefore, the buckling deformation of the horizontal plate 36 is stabilized on the side of the outer wall 18 of the rocker 10, while the absorption amount of collision energy can be increased toward the side of the lower inner wall 26 of the rocker 10.

In this embodiment, it is possible to increase the absorption amount of collision energy without increasing the plate thickness of the horizontal plate 36, by providing the horizontal plate 36 with the ridges 38 and the valleys 40 and varying the amplitude of the ridges 38 and the valleys 40 from the side of the outer wall 18 toward the side of the lower inner wall 26 of the rocker 10. Thus, the rocker structure of the embodiment can increase the absorption amount of collision energy while avoiding an increase in weight.

Moreover, in this embodiment, as shown in FIG. 2, the lower vertical plates 42 are provided inside the lower closed cross-sectional part 32 so as to be propped along the vehicle height direction between the horizontal plate 36 and the lower wall 22 located on the lower side of the lower closed cross-sectional part 32. Thus, the horizontal plate 36 is reinforced and wobbling thereof in the vehicle height direction is suppressed.

As a result, in this embodiment, the plate thickness of the horizontal plate 36 can be made relatively small and a weight reduction of the rocker 10 can be thereby achieved. Moreover, in this embodiment, the rigidity of the rocker 10 can be enhanced and deformation of the rocker 10 can be suppressed compared with when the lower vertical plates 42 are not provided (this case is not shown). In other words, in this embodiment, the load-carrying capacity of the rocker 10 can be increased.

Thus, in this embodiment, it is possible to increase the collision energy absorption efficiency by stabilizing the buckling deformation of the rocker 10, as well as to increase the absorption amount of collision energy as the rocker 10 undergoes buckling deformation by increasing the load-carrying capacity of the rocker 10.

In this embodiment, as shown in FIG. 3, the lower vertical plate 42A is provided between the ridge 38A and the valley 40A on the side of the horizontal plate 36 closer to the outer wall 18. Thus, on the side of the horizontal plate 36 closer to the outer wall 18, the lower vertical plate 42A is subjected to a load in a tensile direction (arrow direction) while the horizontal plate 36 undergoes buckling deformation with the vertex P1 of the ridge 38A forming a starting point of the deformation. As a result, buckling deformation of the lower vertical plate 42A is suppressed and the load-carrying capacity of the rocker 10 can be increased, so that the absorption amount of collision energy as the rocker 10 undergoes buckling deformation can be increased.

In this embodiment, as shown in FIG. 2, the horizontal plate 36 is disposed substantially in the middle of the lower closed cross-sectional part 32 in the vehicle height direction. For example, when the horizontal plate 36 is provided on the lower side of the lower closed cross-sectional part 32 in the vehicle height direction (this case is not shown), the horizontal plate 36 will be left partially uncrushed if the horizontal plate 36 hits the lower wall 22 of the lower closed cross-sectional part 32 (reaches a limit) while undergoing buckling deformation. As a result, collision energy cannot be efficiently absorbed, and the amount of collision energy absorbed by the rocker 10 may be reduced.

For this reason, in this embodiment, the horizontal plate 36 is disposed in the middle of the lower closed cross-sectional part 32. This makes it less likely that the horizontal plate 36 is left partially uncrushed by hitting the horizontal wall 28 or the lower wall 22 of the lower closed cross-sectional part 32, and thereby reaching a limit, while undergoing buckling deformation. As will be described later, it is not essential to dispose the horizontal plate 36 in the middle of the lower closed cross-sectional part 32.

In this embodiment, as shown in FIG. 3, the horizontal plate 36 has the ridges 38 and the valleys 40 that are formed alternately. The ridge 38 is provided on the side of the horizontal plate 36 closer to the outer wall 18, and the level difference y1 between the vertex P1 of the ridge 38A and the point of intersection Q1 between the horizontal plate 36 and the outer wall 18 is set to be smaller than the amplitude A1 of the ridge 38A of the horizontal plate 36.

As a comparative example, for example, when the level difference between the vertex P1 of the ridge 38A and the point of intersection Q1 between the horizontal plate 36 and the outer wall 18 is large (this case is not shown), the horizontal plate 36 undergoes buckling deformation easily. Thus, in this case, the absorption amount of collision energy is reduced.

In this embodiment, therefore, as described above, the level difference y1 between the vertex P1 of the ridge 38A and the point of intersection Q1 between the horizontal plate 36 and the outer wall 18 is set to be smaller than the amplitude A1 of the horizontal plate 36. Thus, the horizontal plate 36 does not easily undergo buckling deformation, and the initial load associated with buckling deformation of the horizontal plate 36 is increased.

In this embodiment, the ridge 38 is formed on the side of the horizontal plate 36 closer to the outer wall 18 in the rocker 10. Thus, when the horizontal plate 36 undergoes buckling deformation in a lateral collision of the vehicle, a part of the horizontal plate 36 on the side of the outer wall 18 deforms upward with the ridge 38 of the horizontal plate 36 forming a starting point of the deformation.

In this embodiment, the lower vertical plate 42A is provided at a position at which the lower vertical plate 42A intersects with the inflection point R1 between the ridge 38A and the valley 40A, and the lower vertical plate 42B is provided at a position at which the lower vertical plate 42B intersects with the inflection point R2 between the valley 40B and the ridge 38B. The inflection points R1, R2 are provided on the neutral axis O of the horizontal plate 36. The inflection points R1, R2 are located in the middle of the height of the corrugation of the horizontal plate 36, and the inflection points R1, R2 form points of intersection of the neutral axis O of the horizontal plate 36.

No moment occurs on the neutral axis O of the horizontal plate 36. Therefore, by providing the lower vertical plates 42A, 42B on the neutral axis O, it is possible to minimize the plate thickness of the lower vertical plates 42A, 42B, and thereby achieve a weight reduction, without imposing an excessive load on the lower vertical plates 42A, 42B. While the ridge 38 is formed on the side of the horizontal plate 36 closer to the outer wall 18 in this embodiment, the valley 40 may instead be formed there.

Supplement to Embodiment

As shown in FIG. 2, in this embodiment, the horizontal plate 36 is provided substantially in the middle of the lower closed cross-sectional part 32 in the vehicle height direction. However, the present disclosure is not limited to this example. As described above, the rocker 10 absorbs collision energy by receiving a reaction force from the battery pack and undergoing buckling deformation, and therefore it is desirable that the position of the horizontal plate 36 be set at a level at which the horizontal plate 36 can effectively receive this reaction force.

For example, when the horizontal plate 36 is provided on the lower side, rather than in the middle, of the lower closed cross-sectional part 32 in the vehicle height direction (this case is not shown), the length of the plurality of lower vertical plates 42 propped between the horizontal plate 36 and the lower wall 22 of the rocker 10 can be made shorter than the length of the lower vertical plates 42 shown in FIG. 2.

When the length of the lower vertical plates 42 is thus reduced, the weight of the lower vertical plates 42 can be reduced accordingly. Moreover, when the horizontal plate 36 is provided on the lower side, rather than in the middle, of the lower closed cross-sectional part 32 in the vehicle height direction and then the lower vertical plates 42 are provided, the center of gravity of the rocker 10 can be set to be farther on the lower side than that of the rocker 10 shown in FIG. 2. Thus, the stability of the vehicle at the time of traveling can be improved.

Here, when the length of the lower vertical plate 42 is reduced, the separation distance between the horizontal plate 36 and the lower wall 22 is reduced accordingly. Therefore, to reduce the likelihood that the horizontal plate 36 reaches a limit at an initial stage after an input of a collision load, the ridge 38 is formed on the side of the horizontal plate 36 closer to the outer wall 18 such that the horizontal plate 36 undergoes buckling deformation toward the side of the lower closed cross-sectional part 32 on which the cross-sectional area is larger.

In this embodiment, the plurality of lower vertical plates 42 is propped between the horizontal plate 36 and the lower wall 22 on the side of the closed cross-sectional part 32B. However, instead of the lower vertical plates 42, a plurality of vertical plates may be propped between the horizontal plate 36 and the horizontal wall 28 on the side of the closed cross-sectional part 32A (this case is not shown).

As shown in FIG. 2 and FIG. 3, in the embodiment, the amplitude of the horizontal plate 36 is set so as to decrease gradually from the side of the outer wall 18 toward the side of the lower inner wall 26 of the rocker 10. However, the amplitude of the horizontal plate 36 in the present disclosure is not limited to this example, as long as it is possible to increase the absorption amount of collision energy while avoiding an increase in weight.

For example, as already described, the amplitude of the ridges 38 and the valleys 40 in the horizontal plate 44 may be set so as to increase gradually in the order of A4, A3, A2, and A1 from the side of the outer wall 18 toward the side of the lower inner wall 26 of the rocker 45 as shown in FIG. 5B.

In this embodiment, the horizontal plate 36 has a corrugated shape as shown in FIG. 5A. However, the shape of the horizontal plate 36 in the present disclosure is not limited to this example, as long as ridges and valleys are formed alternately along the vehicle width direction.

Figure 6A:
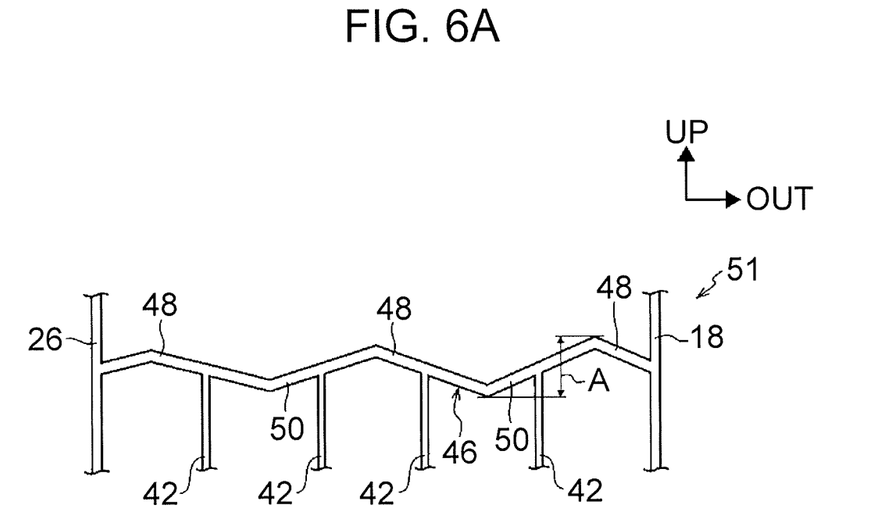
FIG. 6A is an enlarged sectional view of a main part showing a modified example of the rocker structure according to the embodiment.

For example, as shown in FIG. 6A, a horizontal plate 46 may have triangular ridges 48 and valleys 50 so as to form a serrated cross-sectional shape, and the ridges 48 and the valleys 50 may be formed alternately along the vehicle width direction.

While in this example an amplitude A of the ridges 48 and the valleys 50 is set so as to decrease gradually from the side of the outer wall 18 toward the side of the lower inner wall 26 of a rocker 51, the amplitude A may instead be set so as to increase gradually from the side of the outer wall 18 toward the side of the lower inner wall 26 of the rocker 51 as described above. This applies also to the following embodiments.

Figure 6B:
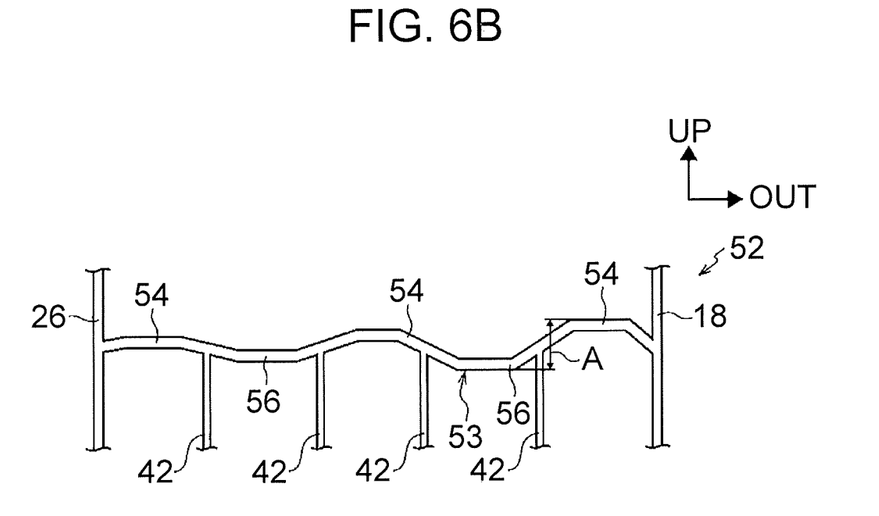
FIG. 6B is an enlarged sectional view of a main part showing a modified example of the rocker structure shown in FIG. 6A.

Other than the horizontal plate 46 shown in FIG. 6A, a horizontal plate 53 of a rocker 52 shown in FIG. 6B may be adopted. The horizontal plate 53 has ridges 54 and valleys 56 having trapezoidal cross-sectional shapes, and the ridges 54 and the valleys 56 are formed alternately along the vehicle width direction.

Moreover, while in this embodiment the horizontal plate 36 has the ridges 38 and the valleys 40 formed alternately and continuously along the vehicle width direction as shown in FIG. 5A, it is not essential to form the ridges 38 and the valleys 40 continuously.

Figure 7A:
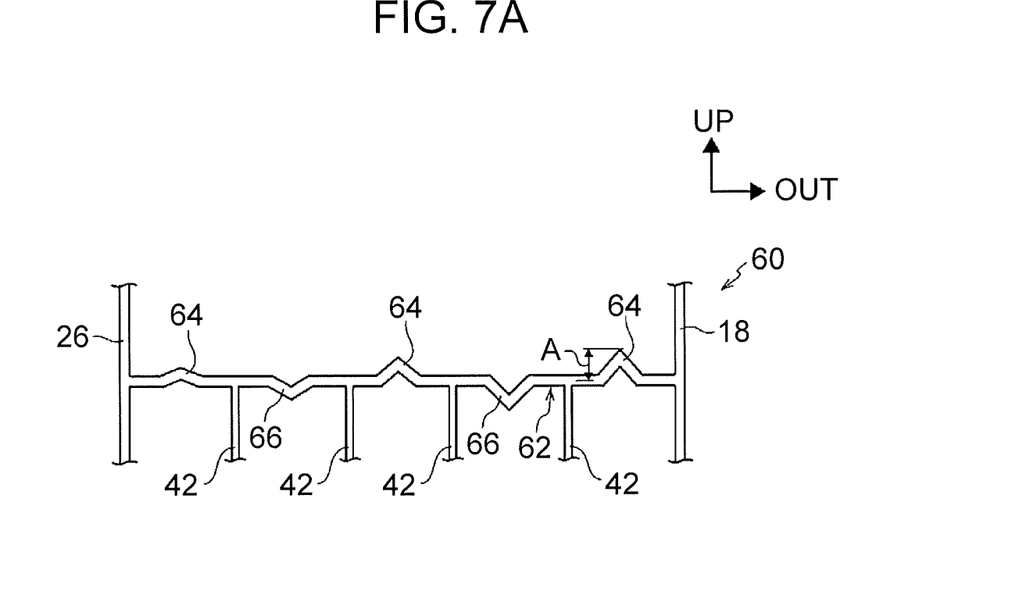
FIG. 7A is an enlarged sectional view of a main part showing a modified example of the rocker structure according to the embodiment.
Figure 7B:
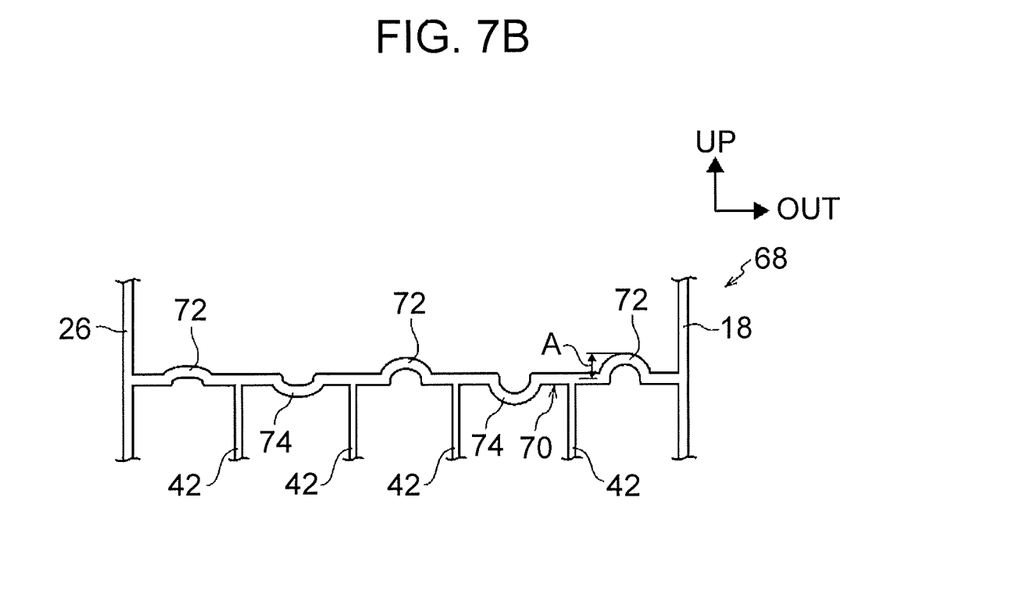
FIG. 7B is an enlarged sectional view of a main part showing a modified example of the rocker structure shown in FIG. 7A.

For example, as in a rocker 60 shown in FIG. 7A, a horizontal plate 62 formed in a straight shape along the vehicle width direction may have ridges 64 and valleys 66 having triangular cross-sectional shapes that are formed discontinuously and alternately. Alternatively, as in a rocker 68 shown in FIG. 7B, a horizontal plate 70 formed in a straight shape along the vehicle width direction may have ridges 72 and valleys 74 having semicircular cross-sectional shapes that are formed discontinuously and alternately.

While an example of the embodiment of the present disclosure has been described above, it should be understood that the embodiment of the present disclosure is not limited to this example, and that the present disclosure can be implemented in various forms within the scope of the gist of the disclosure, for example, by appropriately combining the embodiment and the various modified examples.

What is claimed is:

1. A rocker structure, comprising:
   a closed cross-sectional part that extends along a vehicle front-rear direction on an outer side of a floor panel of a vehicle in a vehicle width direction, the closed cross-sectional part including an outer wall and an inner wall located respectively on an outer side and an inner side of the closed cross-sectional part in the vehicle width direction; and a horizontal plate propped between the outer wall and the inner wall along the vehicle width direction, the horizontal plate having ridges protruding upward in a vehicle height direction and valleys depressed downward in the vehicle height direction that are provided alternately along the vehicle width direction, an amount of protrusion of the ridges and an amount of depression of the valleys varying from an outer wall side toward an inner wall side, wherein a height of a first point of intersection between the horizontal plate and the outer wall in the vehicle height direction is equal to a height of a second point of intersection between the horizontal plate and the inner wall in the vehicle height direction as seen from a lateral side in a horizontal direction.

2. The rocker structure according to claim 1, wherein the amount of protrusion of the ridges and the amount of depression of the valleys decrease from the outer wall side toward the inner wall side.

3. The rocker structure according to claim 1, further comprising
a vertical plate that is provided inside the closed cross-sectional part so as to extend along the vehicle height direction between the horizontal plate and a lower wall located on a lower side of the closed cross-sectional part in the vehicle height direction.

4. The rocker structure according to claim 3, wherein the vertical plate is provided between a vertex of a ridge among the ridges and a vertex of a valley adjacent to the ridge among the valleys in the horizontal plate.

5. The rocker structure according to claim 4, wherein:
the horizontal plate has a first ridge of the ridges on a side closer to the outer wall than a first valley located closest to the outer wall among the valleys; and
the vertical plate is provided at a position at which the vertical plate intersects with an inflection point between the first ridge and the first valley.

6. The rocker structure according to claim 1, wherein the horizontal plate is disposed in a middle of the closed cross-sectional part in the vehicle height direction.

7. The rocker structure according to claim 1, wherein:
the horizontal plate has a corrugated shape in which the ridges and the valleys are alternately formed; and
a first ridge of the ridges is provided on a side of the horizontal plate closer to the outer wall than a first valley closest to the outer wall among the valleys, and a level difference between a vertex of the first ridge and the first point of intersection between the horizontal plate and the outer wall is set to be smaller than an amplitude of the first ridge.

8. A rocker structure, comprising:
a closed cross-sectional part that extends along a vehicle front-rear direction on an outer side of a floor panel of a vehicle in a vehicle width direction, the closed cross-sectional part including an outer wall and an inner wall located respectively on an outer side and an inner side of the closed cross-sectional part in the vehicle width direction; and
a horizontal plate propped between the outer wall and the inner wall along the vehicle width direction, the horizontal plate having ridges protruding upward in a vehicle height direction and valleys depressed downward in the vehicle height direction that are provided alternately along the vehicle width direction, an amount of protrusion of the ridges and an amount of depression of the valleys varying from an outer wall side toward an inner wall side,
wherein the horizontal plate has a corrugated shape in which the ridges and the valleys are alternately formed, and
wherein a first ridge of the ridges is provided on a side of the horizontal plate closer to the outer wall than a first valley closest to the outer wall among the valleys, and a level difference between a vertex of the first ridge and a point of intersection between the horizontal plate and the outer wall is set to be smaller than an amplitude of the first ridge.

* * * * *